(12) United States Patent
     Pallay (10) Patent No.: US 11,043,236 B1
(45) Date of Patent: Jun. 22, 2021

(54) CURVED OUTER GIMBAL STRUT

(71) Applicant: Seagate Technology LLC, Fremont, CA (US)

(72) Inventor: Mark Pallay, Bloomington, MN (US)

(73) Assignee: Seagate Technology LLC, Fremont, CA (US)

( * ) Notice: Subject to any disclaimer, the term of this patent is extended or adjusted under 35 U.S.C. 154(b) by 0 days.

(21) Appl. No.: 17/127,313

(22) Filed: Dec. 18, 2020

(51) Int. Cl.
    *G11B 5/48*     (2006.01)
(52) U.S. Cl.
    CPC .......... *G11B 5/4826* (2013.01); *G11B 5/4833* (2013.01)
(58) Field of Classification Search
    CPC .............................. G11B 5/4826; G11B 5/4833
    USPC .......................................................... 360/244
    See application file for complete search history.

(56) References Cited

U.S. PATENT DOCUMENTS

| | | | |
|---|---|---|---|
| 6,249,404 B1 | 6/2001 | Doundakov et al. | |
| 7,719,798 B2 | 5/2010 | Yao | |
| 7,957,100 B1 | 6/2011 | Schreiber | |
| 8,605,389 B1 | 12/2013 | Pan et al. | |
| 8,879,210 B1 * | 11/2014 | Hahn | G11B 5/483 360/245.3 |
| 8,947,831 B1 * | 2/2015 | Ee | G11B 5/483 360/245.3 |
| 9,147,413 B2 | 9/2015 | Miller et al. | |
| 9,190,086 B1 * | 11/2015 | Ee | G11B 5/483 |
| 9,613,644 B2 | 4/2017 | Miller et al. | |
| 9,646,638 B1 | 5/2017 | Bjorstrom et al. | |
| 2008/0030903 A1 | 2/2008 | Feng | |
| 2009/0067096 A1 | 3/2009 | Bonin | |
| 2014/0285926 A1 | 9/2014 | McCaslin et al. | |

\* cited by examiner

*Primary Examiner* — Allen T Cao (57) ABSTRACT

A head gimbal assembly for supporting a disk drive includes a slider, a load beam, a ring gimbal affixed to the load beam, and a flexure. The gimbal includes a curved outer gimbal strut comprising a protrusion located between a first straight section of the curved outer gimbal strut and a second straight section of the curved outer gimbal strut. The flexure includes a first end extending along the load beam through a center region of a longitudinal axis of the head gimbal assembly and second end that includes a plurality of bond pads electrically coupled to the slider.

19 Claims, 6 Drawing Sheets

CURVED OUTER GIMBAL STRUT

TECHNICAL FIELD

The disclosure relates to a head gimbal assembly for a hard disk drive.

BACKGROUND

Hard disk drives (HDDs) utilize a slider to read and write data on magnetic storage media. In an HDD, the data is stored along a number of concentric tracks of the magnetic storage media. A voice coil motor (VCM) actuates a head gimbal assembly (HGA), which allows precise positioning of a data read/write transducer over the tracks by allowing the transducer to move along multiple axes over the media. As track density increases with increased storage capacities, it becomes more difficult to stay on-track during read/write operations. This difficulty is amplified when the drive is subject to internal and external vibrations, which cause the transducer to shift off-track. Off-track motion affects the ability, of the read/write transducer to write to and read from the desired track.

SUMMARY

The present disclosure describes a head gimbal assembly (HGA) for a hard drive. The HGA includes a load beam and a gimbal connected to the load beam. The gimbal includes a middle portion configured to support the slider and a curved outer gimbal strut. Including a curved outer gimbal strut may reduce the gain in the off-track motion of the slider that is caused by gimbal torsion modes. Reducing the gain caused by the gimbal torsion modes may improve the ability of the HGA to accurately position the slider, which may enable the slider to more accurately read and write data on the magnetic media. Reducing the gain of the gimbal torsion modes in the HGA may, in some scenarios, reduce the likelihood of damaging the slider or other components of the HGA, which may improve longevity and/or reliability of the hard drive.

In one example, a head gimbal assembly for supporting a disk drive includes a slider, a load beam, a gimbal affixed to the load beam including a connector region located at a distal end of the load beam and a central tongue region where the slider is coupled to the load beam. The gimbal further includes an inner gimbal strut that is located at the proximal end of the load beam and a curved outer gimbal strut. The curved outer gimbal strut includes an outer gimbal portion which lies outside the central tongue region. The outer gimbal portion includes a protrusion located between a first and a second straight section of the outer gimbal portion. A straight outer gimbal portion couples the outer gimbal portion to the connector region.

These and other features and aspects of various examples may be understood in view of the following detailed discussion and accompanying drawings.

DETAILED DESCRIPTION

Figure 1:
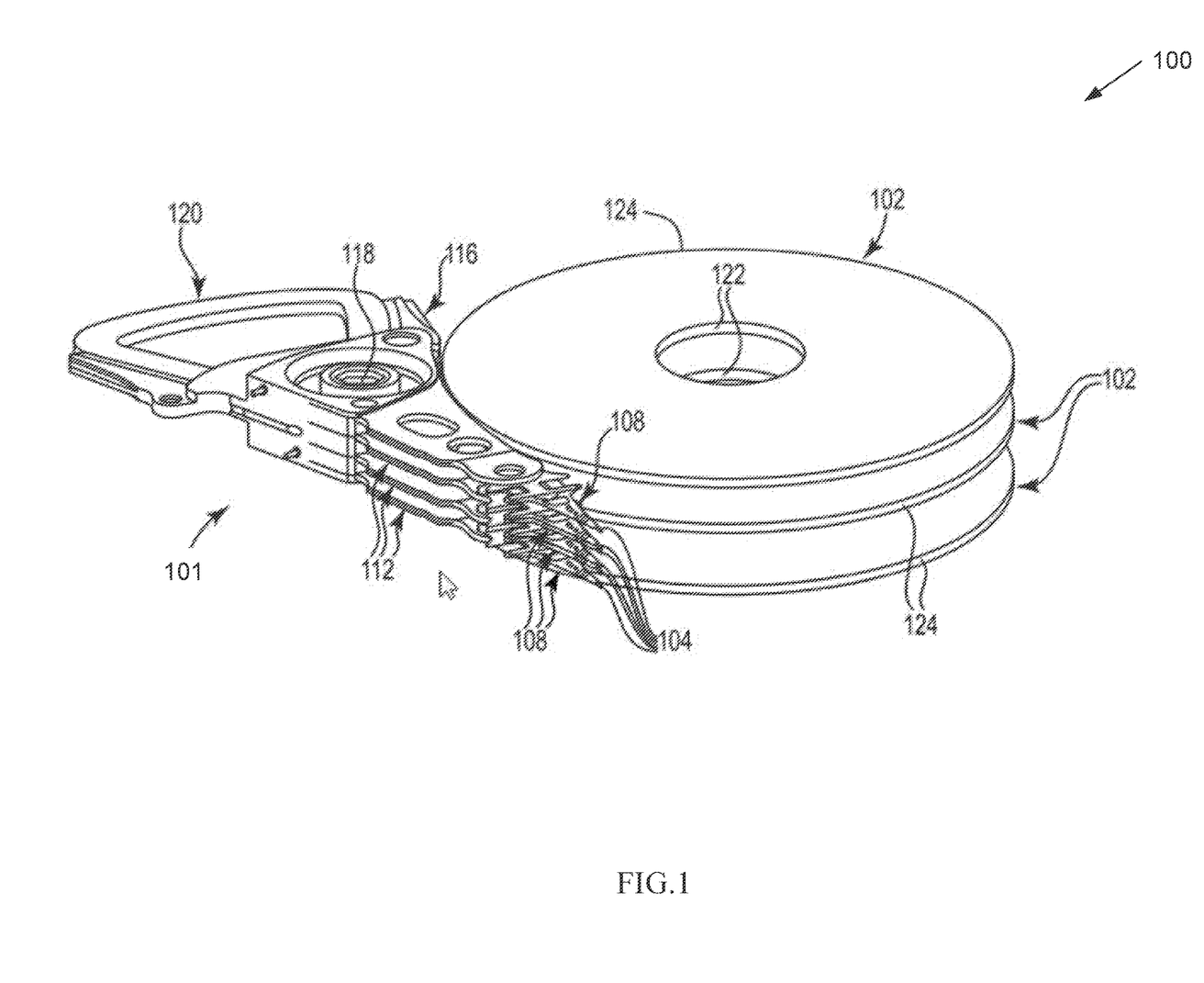
FIG. 1 is a perspective view of a hard disk drive, according to various aspects of the present disclosure.

FIG. 1 is a perspective view of a hard disk drive, according to various aspects of the present disclosure. Hard disk drive 100 includes a head stack assembly 101 and magnetic media 102. In one example, magnetic media 102 includes magnetic disks that each store information or data in a plurality of circular, concentric data tracks.

Head stack assembly 101 includes a voice coil drive actuator 120, an actuator mechanism 116, shaft 118, a plurality of rotatable drive actuator arms 112, and a plurality of head gimbal assemblies 108. Voice coil drive actuator 120 is controlled by servo control circuitry. Voice coil drive actuator 120 is configured to rotate actuator mechanism 116 about shaft 118 in either rotational direction. Rotatable drive actuator arms 112 are each coupled to a respective HGA of HGAs 108, such that rotating actuator mechanism 116 causes rotatable drive actuator arms 112 and HGAs 108 to move relative to magnetic media 102. Each HGA 108 includes a respective slider 104. Positioning HGAs 108, and thus sliders 104, over the surfaces of magnetic media 102, between inner diameters 122 and outer diameters 124 of magnetic media 102 enables sliders 104 to read data from and write data to magnetic media 102. In some examples, sliders 104 are themselves aerodynamically designed to fly on an air bearing that is created adjacent to each disk surface during disk rotation.

Figure 2:
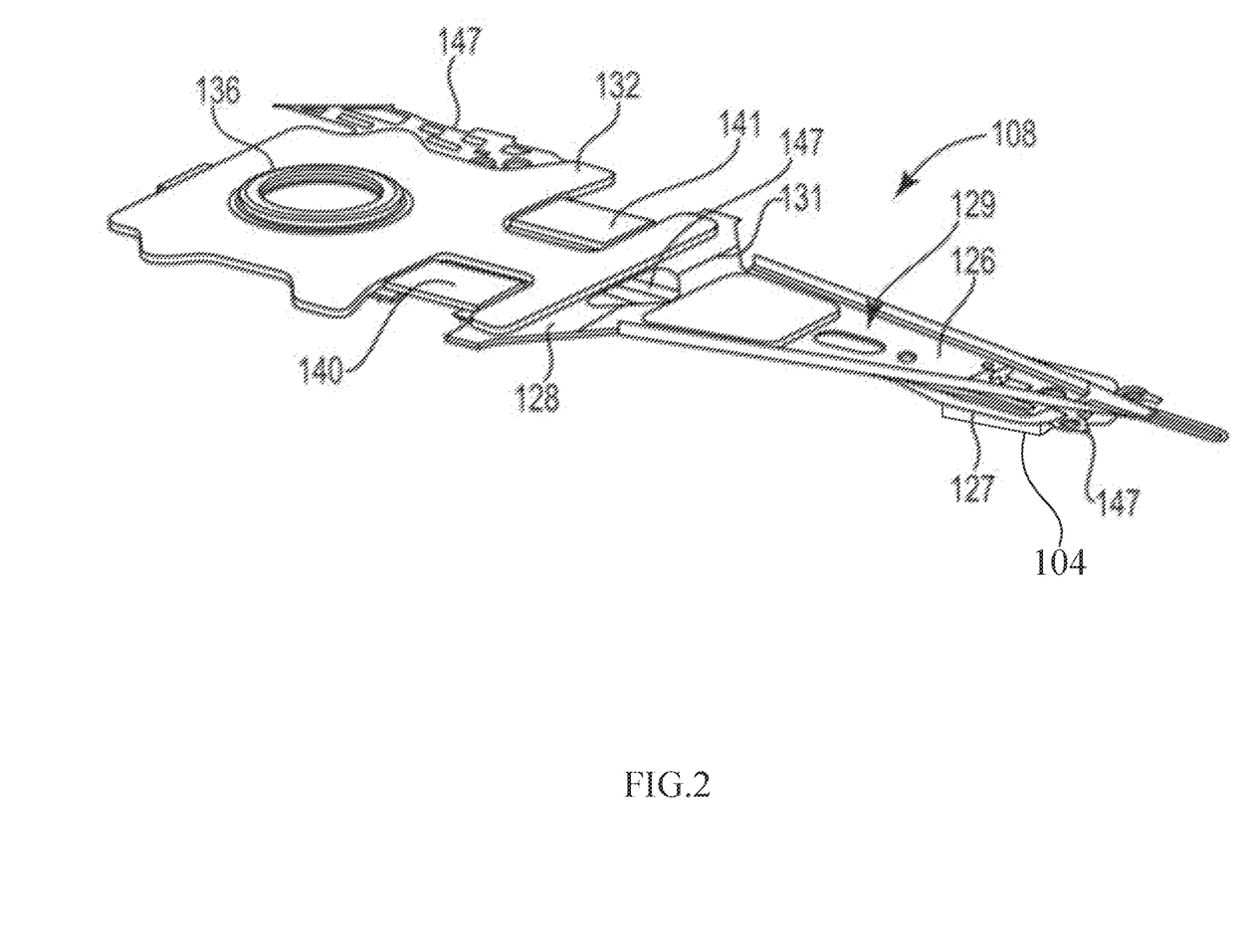
FIG. 2 is a perspective view of an example head gimbal assembly, according to various aspects of the present disclosure.

FIG. 2 is a perspective view of HGA 108 of FIG. 1, according to various aspects of the present disclosure. HGA 108 includes a baseplate or mount 132, a load beam 126, a gimbal 127, and a slider 104.

Baseplate 132 includes an attachment structure 136, such as a boss tower, that is configured to couple to rotatable drive actuator arm 112 of FIG. 1. In one example, attachment structure 136 is integrally formed with baseplate 132. Baseplate 132 and attachment structure 136 may each be made of a ferrite (e.g., stainless steel) or other suitable material (e.g., aluminum, engineered plastic, and the like).

In one example, load beam 126 includes a base portion 128, a hinge region 131, and a rigid region 129. Load beam 126 may be made of a ferrite (e.g., stainless steel) or other suitable material. Base portion 128 of load beam 126 is mechanically coupled to baseplate 132. In some examples, base portion 128 is coupled to baseplate 132 via welding (e.g., laser welding). Hinge region 131 (also referred to as a spring region) provides load beam 126 with a preload force that acts against the lift force action of slider 104 as slider 104 flies relative to the disk surface. The preload force urges slider 104 towards the surface of a magnetic media 102 during flight to maintain a desired fly height. In some examples, hinge region 131 is integrated with and contiguous with load beam 126 as a single part.

Rigid region 129 of load beam 126 extends from hinge region 131 to the tip of the HGA 108. In the example of FIG. 2, hinge region 131 is disposed between base portion 128 and rigid region 129.

Gimbal 127 provides a slider mounting portion that is pivotable about a dimple on load beam 126, as provided from an end portion of the rigid region 129 of the load beam 126. Gimbal 127 provides a moveable slider mounting pad to which slider 104 is attached so that slider 104 can move in the pitch, roll, and yaw directions in response to variations while flying relative to a disk surface.

As shown in the example of FIG. 2, HGA 108 includes a pair of microactuators 140 and 141 located adjacent to baseplate 132. While voice coil drive actuator 120 of FIG. 1 rotates actuator mechanism 116 to provide relatively coarse positioning of sliders 104, microactuators 140 and 141 provide HGA 108 with relatively fine or precision positioning of slider 104 at the surface of magnetic media 102. In one example, microactuators 140 and 141 are piezoelectric microactuators. Piezoelectric microactuators convert an electrical signal into controlled physical displacements. In another example, microactuators 140 and 141 include lead zirconate titanate (PZT). In some examples, HGA 108 may include a plurality of pairs of microactuators which may be positioned at various locations on HGA 108.

In some examples, HGA 108 includes flexure 147. Flexure 147 includes a plurality of electrical conductors 305 (also referred to as electrical leads or electrical traces) that provide electrical signals for communication with the read and write heads of slider 104 as well as for microactuator control. In some examples, flexure 147 includes a substrate or bottom layer of insulating material (e.g., polyimide), capped with a top layer of insulating material (e.g., polyimide) with a layer of semi-rigid conducting material (e.g., copper or stainless steel) disposed between the top and the bottom insulating layers.

Flexure 147 may, in some examples, be bonded along HGA 108. In reference to FIG. 2, flexure 147 runs along load beam 126 from the base portion 128 to rigid region 129 to electrically connect with the read/write head of the slider 104.

Figure 3:
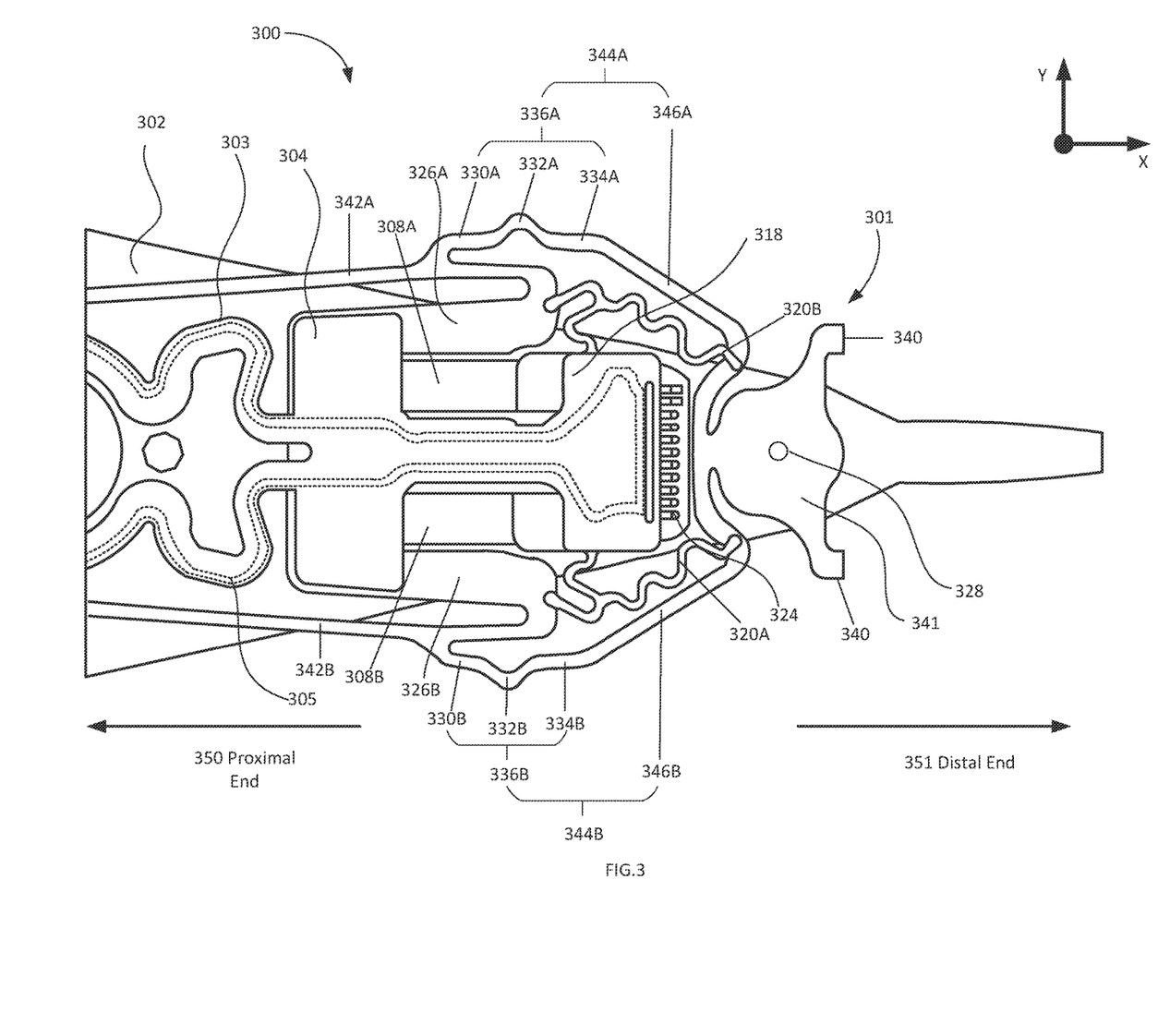
FIG. 3 is a bottom view of an example head gimbal assembly, according to various aspects of the present disclosure.

FIG. 3 is a bottom view of an example head gimbal assembly, according to various embodiments of the present disclosure. Head gimbal assembly 300 is an example of head gimbal assembly 108 of FIGS. 1 and 2. In the example of FIG. 3, head gimbal assembly 300 includes a gimbal 301, a load beam 302, a flexure 303, a plurality of microactuators 308A and 308B (collectively 308), and a plurality of flexible tethers 320A and 320B (collectively flexible tethers 320).

Load beam 302 has longitudinal length and includes proximal end 350 and distal end 351 that is opposite proximal end 350. Proximal end 350 includes the leading edge of the head gimbal assembly 300 and the distal end 351 includes the trailing edge of the head gimbal assembly 300. The terms "leading edge" and "trailing edge" refer to the direction of travel of the magnetic media underneath the slider. In the example shown in FIG. 3, the magnetic media travels from the proximal end 350 of the head gimbal assembly 300 to the distal end 351 of the head gimbal assembly 300.

In the example of FIG. 3, flexure 303 electrically connects the read and write heads of the slider (not shown in FIG. 3) and a plurality of bond pads 324 to an external control system. Flexure 303 can include any number of leads or traces. In some examples, flexure 303 includes a plurality of stacked layers, such as one or more conducting layer and one or more insulating layer. In some examples, the stacked layers include a top layer of insulating material (e.g., polyimide), a middle layer of conducting material (e.g., copper, stainless steel, or an alloy conductor), and a bottom layer of insulating material.

Bond pads 324 provide a termination point for flexure 303 at the distal end 351 of the head gimbal assembly 300. Bond pads 324 are typically connected to the slider bond pads (not shown) by solder ball bonding. Flexure 303 extends along the load beam 302 through a center region of head gimbal assembly 300. Flexure 303 is tethered at the proximal end 350 of head gimbal assembly 300 at stator region 304 and is connected to central tongue region 318 towards the distal end 351 of the head gimbal assembly 300.

Flexible tethers 320 extend onto inner gimbal blocks 326 and couple with both inner gimbal blocks 326 and central tongue region 318 from locations on curved outer gimbal struts 344. In some examples, flexible tethers 320 are configured to act as stabilizers and restrain movement of the head-carrying region of the head gimbal assembly 300 in the z-direction (e.g., out of the page), also referred to as the down track direction. Though the flexible tethers 320 are intended to provide restraint to shock movement of the head-carrying region, in some examples, flexible tethers 320 are constructed from a low-stiffness material such that the freedom of movement of the head carrying region is not restrained. In one example, flexible tethers 320 may include a polyimide layer.

Gimbal 301 has a top surface and a bottom surface. The bottom surface of gimbal 301 is configured to face the magnetic media side of the load beam 302 and includes the central tongue region 318 to which the slider (not shown in FIG. 3) is secured. Gimbal 301 and central tongue region 318 allow for the slider to move in pitch and roll directions while flying relative to the disk surface. In some examples, gimbal 301 provides support for flexure 303 and is coupled to load beam 302 at weld point 328 on connector region 341. In some examples, gimbal 301 may be made from stainless steel.

Gimbal 301 includes inner gimbal struts 342A and 342B (collectively 342), curved outer gimbal struts 344A and 344B (collectively, curved outer gimbal struts 344), inner gimbal blocks 326A and 326B (collectively, inner gimbal blocks 326), stator region 304, central tongue region 318, detab region 340, and connector region 341. In some examples, flexure 303 is coupled to gimbal 301 at stator region 304 and central tongue region 318 and is disposed between gimbal 301 and the slider within stator region 304 and central tongue region 318. Connector region 341 is configured to couple gimbal 301 to load beam 302 at a distal end 351 of load beam 302. For example, connector region 341 may include weld point 328 that couples gimbal 301 to load beam 302. Detab region 340 is located at the distal end 351 of head gimbal assembly 300 and is configured to support the gimbal during gimbal manufacture.

Inner gimbal struts 342 extend from a proximal end 350 of load beam 302 toward distal end 351 of load beam 302. Inner gimbal struts 342 join with curved outer gimbal struts 344 at a point adjacent to inner gimbal blocks 326. In some examples, inner gimbal blocks 326 are adjacent (e.g., within approximately 10-100 microns) to microactuators 308 and may extend from proximal end 350 towards distal end 351 of head gimbal assembly 300. In one example, an inner edge of gimbal blocks 326 may be substantially parallel (e.g., within 3-degrees) to microactuators 308.

In some examples, curved outer gimbal struts 344 include a protrusion disposed between two approximately straight portions that are approximately parallel (e.g., within 5 degrees) to microactuators 308. In the example of FIG. 3, curved outer gimbal struts 344A and 344B further include outer gimbal portions 336A and 336B (collectively, outer gimbal portions 336) and straight outer gimbal portions 346A and 346B (collectively, straight outer gimbal portions 346). Outer gimbal portions 336 extend from inner gimbal struts 342 at a point adjacent to inner gimbal blocks 326 towards straight outer gimbal portions 346 and lie outside central tongue region 318. In some examples, outer gimbal portions 336 may be U-shaped or parabolic or may include smooth radial curved features including one or more bends. In some examples, curved outer gimbal struts 344 may include a protrusion of a different shape, such as a triangle, rectangle, or any other shape protruding away from the slider and lying between two approximately straight portions of the outer gimbal struts.

Straight outer gimbal portions 346 are coupled to the distal end of outer gimbal portions 336 and terminate at connector region 341.

Outer gimbal portions 336 include three or more sections. In one example, outer gimbal portions 336 include straight sections 330A and 330B (collectively, straight sections 330), protrusions 332A and 332B (collectively, protrusions 332), and straight sections 334A and 334B (collectively, straight sections 334). Outer gimbal portions 336 are configured to increase flexibility in head gimbal assembly 300 and in some examples may have lower stiffness than their straight counterparts. In contrast to examples that lower the stiffness of the gimbal by decreasing the width of the outer strut and/or increasing the length of the outer strut, which may adversely affect other aspects of the gimbal, utilizing a curved outer gimbal strut may reduce the stiffness of the outer gimbal strut while minimizing the effect on the struts attached to the curved outer gimbal strut. In some examples, a decrease in stiffness may reduce the gain in the off-track motion (e.g., in Y-direction of FIG. 3 of slider 104 from gimbal torsion modes by allowing more flexibility in the suspension. Changing the length of the outer strut without other modifications to outer strut may result in a corresponding change in the length of adjacent struts which may impact stiffness of the adjacent struts. This could complicate gimbal design as optimization of the shape or width or profile of multiple gimbal struts, instead of a single gimbal strut, may be needed in order to meet design requirements.

In some examples, an increase in stroke of approximately 5-10% is observed for gimbal designs that include curved outer gimbal struts 344. In the example of FIG. 3, the stroke refers to the range of motion with which microactuators 308 can move slider (eg., slider 104 of FIG. 2) relative to the magnetic media (in Y-direction of FIG. 3). An increase of stroke may provide the benefit of more accurate positioning of the slider over the magnetic media which may lead to a more efficient data transfer between the read/write head and the magnetic media.

Figure 4:
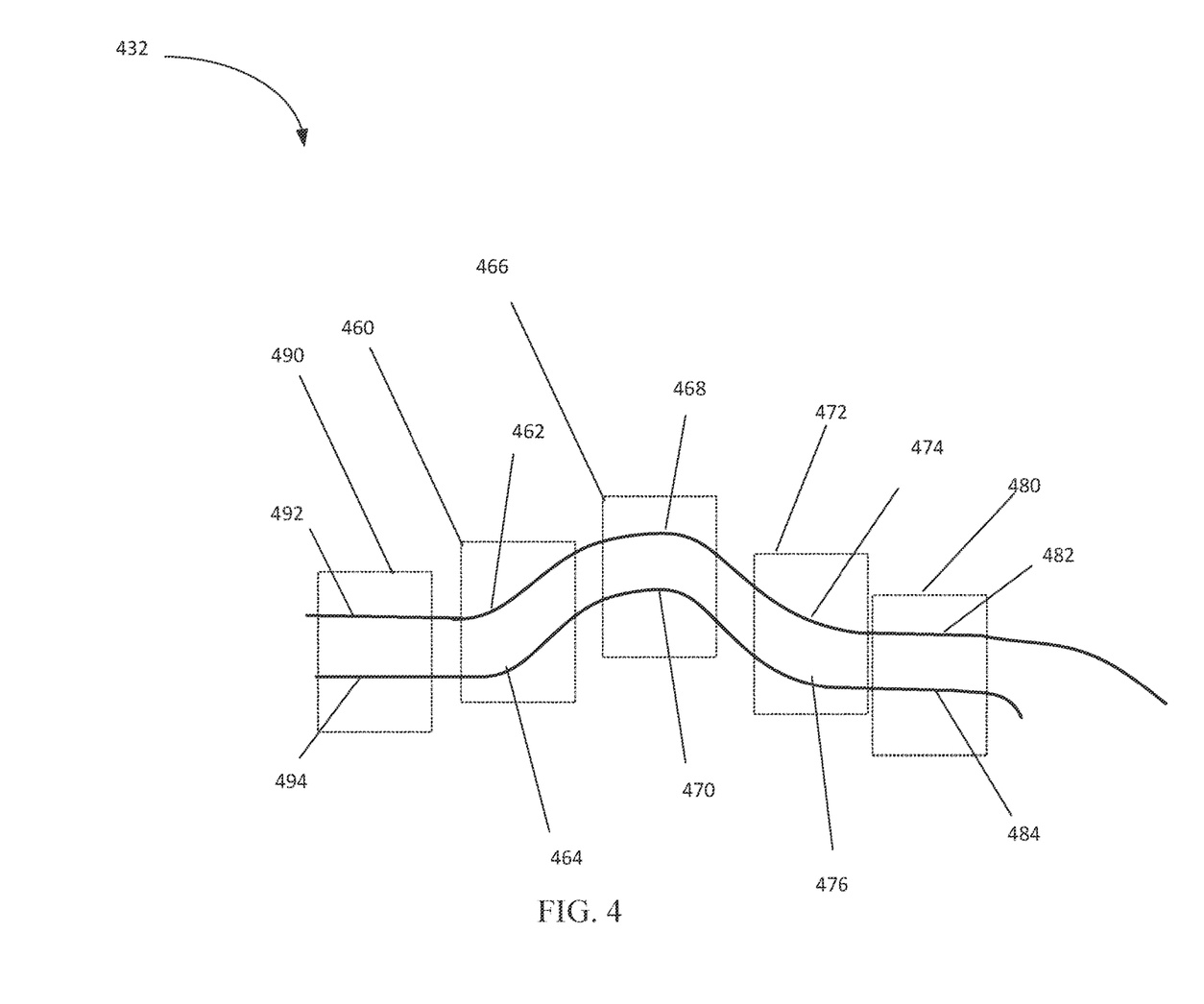
FIG. 4 is a zoomed-in view of an example curved outer gimbal strut, according to various aspects of the present disclosure.

FIG. 4 provides a zoomed-in view of outer gimbal portion 336A. In the example of FIG. 4, protrusion 432 (332 of FIG. 3A) includes a continuously smooth radial bend and further comprises a first straight section 490, a first curved section 460, a second curved section 466, a third curved section 472 and a second straight section 480. First straight section 490 comprises inner edge 494 and outer edge 492 where inner edge 494 is parallel to outer edge 492. Second straight section 480 comprises inner edge 484 and outer edge 482 where inner edge 484 is parallel to outer edge 482. First curved section 460 comprises inner curved section 464 with radius of curvature between 0.23 and 0.27 millimeters and outer curved section 462 with radius of curvature between 0.16 and 0.20 millimeters. Second curved section 466 comprises inner curved section 470 with radius of curvature between 0.05 and 0.09 millimeters and outer curved section 468 with radius of curvature between 0.11 and 0.15 millimeters. Third curved section 472 comprises inner curved section 476 with radius of curvature between 0.23 and 0.27 millimeters and outer curved section 474 with radius of curvature between 0.16 and 0.20 millimeters. Changing radii of inner curved sections 464, 470 and 476 or outer curved sections 462, 468 and 474 beyond these dimensions may, in some cases, result in an increase in gain of gimbal torsion modes and have a detrimental effect on HGA 108 performance for gimbal designs illustrated in the present disclosure. In some examples, however, radii of inner curved sections 464, 470 and 476 or outer curved sections 462, 468 and 474 may be outside the ranges stated.

Figure 5:
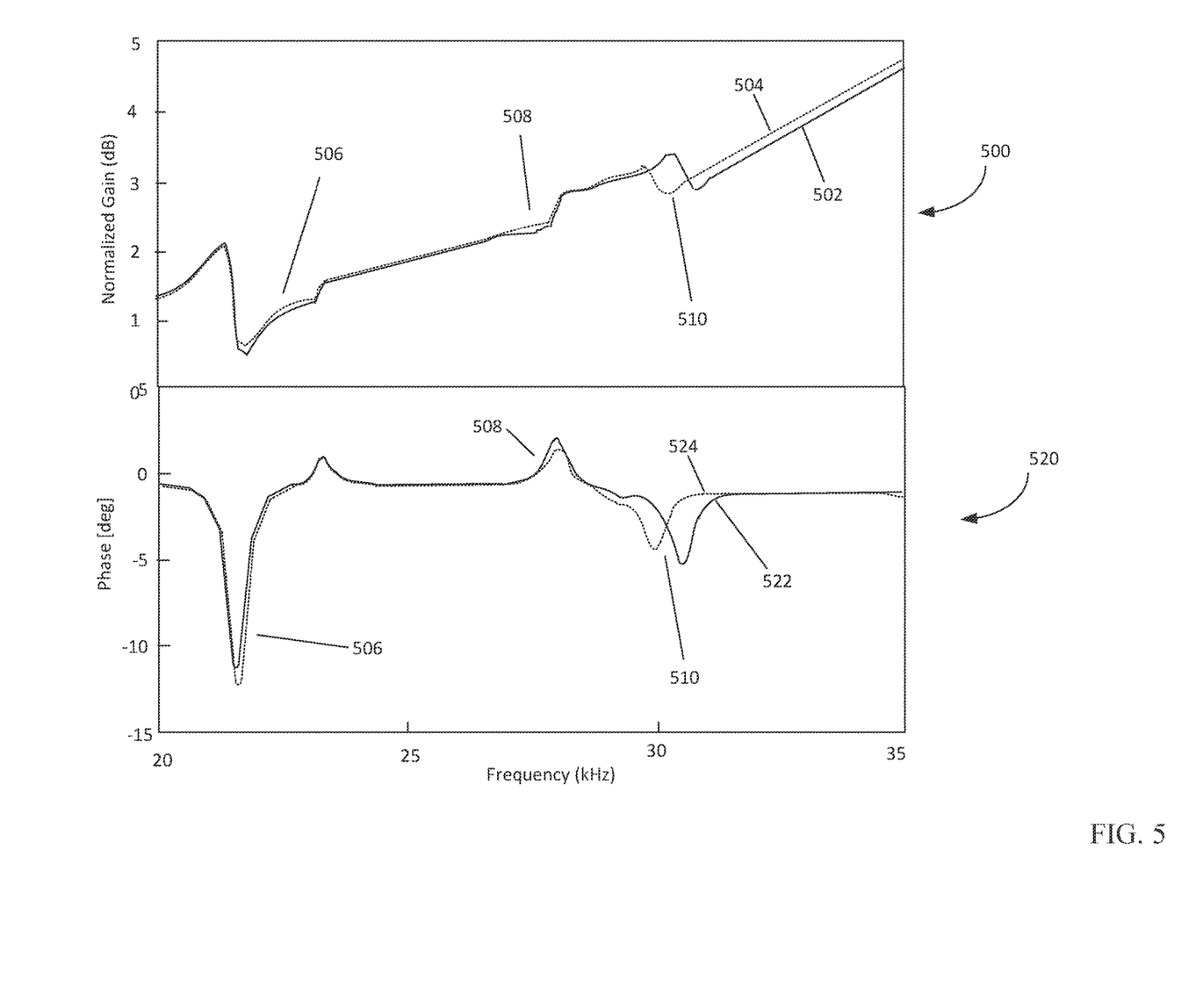
FIG. 5 is an example of the frequency response of an example HGA, according to various aspects of the present disclosure.
Figure 6:
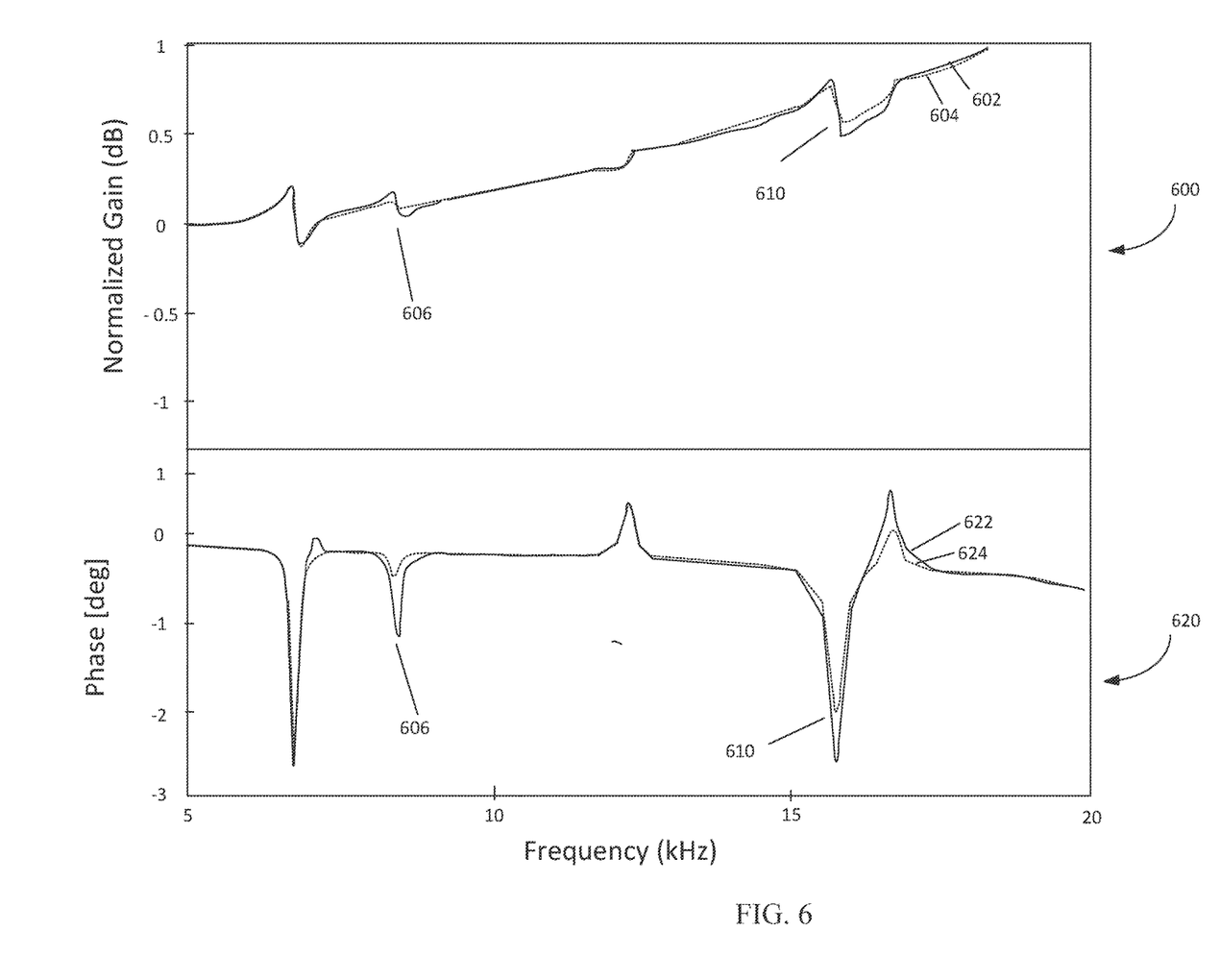
FIG. 6 is an example of the frequency response of an example HGA, according to various aspects of the present disclosure

FIG. 5 is an example of the frequency response (or Bode plots) of HGA 300 measured in the 20-35 kHz range, according to various aspects of the present disclosure. Plot 500 is an example of a Bode magnitude plot and 520 is an example of a Bode phase plot, according to various aspects of the present disclosure. In hard disk drives there are several sources of excitation that can cause the head gimbal assembly to vibrate at different frequencies. Such vibrations can interfere with accurate positioning of the slider, thus hard disk drive electronics are designed in such a way as to accept a certain amount of amplitude at certain frequency ranges. In some instances, decreasing stiffness of gimbal 301 may reduce the gain in in the gimbal torsion modes thus improving the off-track motion of the slider. In the example of FIG. 5, solid line plots 502 and 522 represent the frequency response of an example HGA that does not comprise gimbal 301 with curved outer gimbal struts 344. Dotted line plots 504 and 524 represent the frequency response of HGA 300 comprising gimbal 301 with curved outer gimbal struts 344. FIG. 5 illustrates a number of high frequency torsion modes for HGA 300 including baseplate torsion mode 506 at ~23.5 kHz and sway mode 508 at ~28 kHz. In the example of gimbal 301 comprising curved outer gimbal struts 344, little change is observed in the frequency response of baseplate torsion mode 506 and sway mode 508. In some examples however, utilizing curved outer gimbal strut 344 may reduce stiffness in gimbal 301 and subsequently improve the frequency response of gimbal torsion mode 510 of HGA 300. In the example of FIG. 5 gimbal torsion mode 510 at ~30 kHz illustrates a decrease in measured gain for HGA 300 comprising curved outer gimbal struts 344 thereby potentially increasing accuracy of the slider placement and/or longevity of various components of the hard disk drive FIG. 6 is an example of the frequency response (or Bode plots) of HGA 300 measured in the 5-20 kHz range, according to various aspects of the present disclosure. Plot 600 is an example of a Bode magnitude plot and 620 is an example of a Bode phase plot. In the example of FIG. 6, solid line plots 602 and 622 represent the frequency response of an example HGA that does not comprise gimbal 301 with curved outer gimbal struts 344. Dotted line plots 604 and 624 represent the frequency response of HGA 300 comprising gimbal 301 with curved outer gimbal struts 344. FIG. 6 illustrates a number of low frequency torsion modes for HGA 300 including gimbal torsion mode 606 at ~8 kHz and second gimbal torsion mode 610 at ~16 kHz. In the example of FIG. 6 gimbal torsion mode 610 at ~16 kHz illustrates a decrease in measured gain for HGA 300 comprising curved outer gimbal struts 344 thereby potentially increasing accuracy of the slider placement and/or longevity of various components of the hard disk drive Various examples have been presented for the purposes of illustration and description. These and other examples are within the scope of the following claims.

What is claimed is:

1. A head gimbal assembly for supporting a disk drive, the head gimbal assembly comprising:
   a slider;
   a load beam; and
   a gimbal affixed to the load beam, the gimbal comprising:
      a connector region configured to couple the gimbal to the load beam at a distal end of the load beam;
      a central tongue region, wherein the slider is coupled to the central tongue region of the gimbal;
      an inner gimbal strut located at a proximal end of the load beam; and
      a curved outer gimbal strut comprising;
         an outer gimbal portion which lies outside the central tongue region, wherein the outer gimbal portion comprises a first straight section, a second straight section, and a protrusion located between the first straight section and the second straight section; and
         a straight outer gimbal portion which couples the outer gimbal portion to the connector region.

2. The head gimbal assembly of claim 1, wherein the outer gimbal portion comprises an inner edge and an outer edge, wherein the inner edge is parallel to the outer edge in the first straight section and in the second straight section.

3. The head gimbal assembly of claim 2, wherein a radius of the outer edge of the outer gimbal portion is greater than a radius of the inner edge of the outer gimbal portion in the protrusion.

4. The head gimbal assembly of claim 2, wherein a distance between the inner edge of the curved outer gimbal strut and the outer edge of the curved outer gimbal strut is constant.

5. The head gimbal assembly of claim 1, wherein the protrusion further comprises a first curved section, a second curved section and a third curved section.

6. The head gimbal assembly of claim 5, wherein a radius of an inner edge of the first curved section is between 0.23 and 0.27 millimeters.

7. The head gimbal assembly of claim 5, wherein a radius of an outer edge of the first curved section is between 0.16 and 0.20 millimeters.

8. The head gimbal assembly of claim 5, wherein the second curved section of the curved outer gimbal strut includes an inner edge having a radius between 0.05 and 0.09 millimeters.

9. The head gimbal assembly of claim 5, wherein the second curved section of the curved outer gimbal strut includes an outer edge having a radius between 0.11 and 0.15 millimeters.

10. The head gimbal assembly of claim 5, wherein the third curved section of the curved outer gimbal strut includes an inner edge having a radius between 0.23 and 0.27 millimeters.

11. The head gimbal assembly of claim 5, wherein the third curved section of the curved outer gimbal strut includes an outer edge having a radius between 0.16 and 0.20 millimeters.

12. The head gimbal assembly of claim 1, wherein the gimbal comprises stainless steel.

13. A gimbal for a head gimbal assembly for a hard disk drive, the gimbal comprising:
   a central tongue region configured to support a slider that includes a writer configured to write data to a magnetic media and a reader configured to read data from the magnetic media;
   a connector region configured to couple the gimbal to a load beam;
   an inner gimbal strut located distal to the central tongue region; and
   a curved outer gimbal strut comprising;
      an outer gimbal portion which lies outside the central tongue region, wherein the outer gimbal portion comprises a first straight section, a second straight section, and a protrusion located between the first straight section and the second straight section; and
      a straight outer gimbal portion which couples the outer gimbal portion to a detab region.

14. The gimbal of claim 13, wherein the curved outer gimbal strut comprises:
   a first straight section;
   a second straight section, and
   a protrusion between the first straight section and the second straight section.

15. The gimbal of claim 14, wherein the outer gimbal portion comprises an inner edge and an outer edge, wherein the inner edge is parallel to the outer edge in the first straight section and in the second straight section.

16. The gimbal of claim 15, wherein a radius of the outer edge of the outer gimbal portion is greater than a radius of the inner edge of the outer gimbal portion in the protrusion.

17. The gimbal of claim 15, wherein a distance between the inner edge of the curved outer gimbal strut and the outer edge of the curved outer gimbal strut is constant.

18. The gimbal of claim 14, wherein the protrusion further comprises a first curved section, a second curved section and a third curved section.

19. The gimbal of claim 13, wherein the gimbal comprises stainless steel.

* * * * *